United States Patent
Donegan et al.

(10) Patent No.: US 8,833,302 B2
(45) Date of Patent: Sep. 16, 2014

(54) BIRD FEEDER WITH ROTATING PERCH

(71) Applicant: Classic Brands, LLC, Denver, CO (US)

(72) Inventors: Robert Donegan, Denver, CO (US); Bryan Krueger, Denver, CO (US)

(73) Assignee: Classic Brands, LLC, Denver, CO (US)

( * ) Notice: Subject to any disclaimer, the term of this patent is extended or adjusted under 35 U.S.C. 154(b) by 0 days.

(21) Appl. No.: 13/855,565

(22) Filed: Apr. 2, 2013

(65) Prior Publication Data

US 2013/0255582 A1 Oct. 3, 2013

Related U.S. Application Data

(60) Provisional application No. 61/619,414, filed on Apr. 2, 2012.

(51) Int. Cl.
*A01K 31/12* (2006.01)
*A01K 39/012* (2006.01)
*A01K 39/01* (2006.01)

(52) U.S. Cl.
CPC .............. *A01K 39/01* (2013.01); *A01K 39/012* (2013.01)
USPC ........................................ 119/57.8; 119/52.2

(58) Field of Classification Search
USPC ......... 119/57.8, 52.3, 57.9, 51.01, 52.2, 52.4, 119/59, 63
See application file for complete search history.

(56) References Cited

U.S. PATENT DOCUMENTS

| | | | |
|---|---|---|---|
| 117,807 A | 8/1871 | Orndoff | |
| D8,908 S | 1/1876 | Wiley | |
| 276,392 A | 4/1883 | Gregory | |
| 447,006 A | 2/1891 | Sweeney | |
| 632,167 A | 8/1899 | Biesmeyer | |
| 727,597 A | 5/1903 | Day | |
| 813,954 A | 2/1906 | Davis | |
| D43,781 S | 4/1913 | Sanford | |
| 1,251,935 A | 1/1918 | Stevens | |
| D63,321 S | 11/1923 | Pirson | |
| 1,558,316 A | 10/1925 | Tipple | |
| 1,634,569 A | 7/1927 | Bray | |
| 1,718,432 A | 6/1929 | Qualmann | |
| D81,602 S | 7/1930 | Teague | |
| 1,791,956 A | 2/1931 | Cowles | |
| D87,460 S | 8/1932 | Cook | |
| 1,879,318 A | 9/1932 | Klein | |
| 1,891,042 A | 12/1932 | Benoit | |
| D109,128 S | 4/1938 | Copeman | |
| D115,321 S | 6/1939 | Pueschel | |
| 2,283,373 A | 5/1942 | Krafft | |

(Continued)

OTHER PUBLICATIONS

Ex Parte Quayle Action, U.S. Appl. No. 29/437,624, mailed Jun. 7, 2013, 23 pages.

(Continued)

*Primary Examiner* — Trinh Nguyen
(74) *Attorney, Agent, or Firm* — Polsinelli PC

(57) ABSTRACT

Implementations described and claimed herein provide apparatuses and methods for providing different perch positions for feeding birds. In one implementation, a bird feeder includes a reservoir and a perch. The reservoir has an interior configured to hold bird food and an opening in a wall to provide access to the interior of the reservoir. The perch is connected to the wall such that the perch may be moved to a plurality of positions around the opening in the wall.

8 Claims, 13 Drawing Sheets

(56) References Cited

U.S. PATENT DOCUMENTS

| | | |
|---|---|---|
| 2,350,922 A | 6/1944 | Planeta |
| 2,417,178 A | 3/1947 | Ritter |
| D153,759 S | 5/1949 | Blatt |
| 2,510,721 A | 6/1950 | Smith |
| 2,531,915 A | 11/1950 | Maly |
| D164,692 S | 10/1951 | Kelly |
| D165,799 S | 1/1952 | Stedman |
| D167,179 S | 7/1952 | Stewart |
| 2,634,705 A | 4/1953 | Mayes |
| D170,150 S | 8/1953 | Kowap |
| D173,658 S | 12/1954 | Jones |
| 2,696,803 A | 12/1954 | Deffenbaugh |
| D174,139 S | 3/1955 | Sadler |
| 2,725,663 A | 12/1955 | Mullen |
| D178,917 S | 10/1956 | England et al. |
| 2,773,474 A | 12/1956 | Nugent |
| 2,786,446 A | 3/1957 | Newman |
| D180,686 S | 7/1957 | Everett |
| 2,804,844 A | 9/1957 | Gigliotti |
| 2,887,987 A | 5/1959 | Fitzgerald et al. |
| D185,456 S | 6/1959 | Michalek et al. |
| 2,891,508 A | 6/1959 | Bower |
| 2,944,516 A | 7/1960 | Malloy, Sr. |
| 2,971,671 A | 2/1961 | Shakman |
| 2,987,041 A | 6/1961 | Bard |
| 3,022,768 A | 2/1962 | Lynch |
| 3,051,126 A | 8/1962 | Merritt et al. |
| 3,051,303 A | 8/1962 | Daanen |
| D193,558 S | 9/1962 | Parry |
| D194,750 S | 3/1963 | Dahmus |
| 3,090,354 A | 5/1963 | Merritt et al. |
| 3,136,296 A | 6/1964 | Luin |
| 3,145,690 A | 8/1964 | Bachman |
| D199,995 S | 1/1965 | Knodt |
| D200,778 S | 4/1965 | Pregont |
| 3,244,150 A | 4/1966 | Blair |
| D206,975 S | 2/1967 | Dawson |
| 3,307,602 A | 3/1967 | Boster |
| 3,316,884 A | 5/1967 | Viggars |
| 3,372,676 A | 3/1968 | Williams |
| D216,002 S | 11/1969 | Stone |
| D216,361 S | 12/1969 | Pappas, Jr. |
| 3,499,413 A | 3/1970 | Heard |
| D217,470 S | 5/1970 | Morrow |
| 3,526,335 A | 9/1970 | Swett et al. |
| 3,693,310 A | 9/1972 | Middleton |
| D230,948 S | 3/1974 | Moon |
| D234,180 S | 1/1975 | Dart et al. |
| D235,744 S | 7/1975 | England |
| 3,901,192 A | 8/1975 | Adams |
| 3,967,576 A | 7/1976 | Soerensen |
| 3,977,363 A | 8/1976 | Fisher, Jr. |
| D241,699 S | 10/1976 | Barecki |
| D241,860 S | 10/1976 | Calamia |
| D244,786 S | 6/1977 | Dryden |
| D244,883 S | 6/1977 | Rohrmuller |
| 4,030,451 A | 6/1977 | Miller |
| D245,349 S | 8/1977 | Fisher, Jr. |
| D245,643 S | 8/1977 | Orfei |
| D245,927 S | 9/1977 | Edwards et al. |
| D248,006 S | 5/1978 | Christian |
| D249,726 S | 9/1978 | Cosman |
| 4,144,842 A | 3/1979 | Schlising |
| 4,188,913 A * | 2/1980 | Earl et al. ..................... 119/57.9 |
| 4,194,714 A | 3/1980 | Schultz |
| 4,201,155 A | 5/1980 | Hyde, Jr. |
| D257,179 S | 9/1980 | Campo |
| 4,223,637 A * | 9/1980 | Keefe .......................... 119/52.2 |
| D258,338 S | 2/1981 | Gersin |
| D260,843 S | 9/1981 | Laird et al. |
| 4,327,669 A | 5/1982 | Blasbalg |
| 4,331,104 A | 5/1982 | Clarke |
| D266,611 S | 10/1982 | Metts et al. |
| D267,355 S | 12/1982 | Blasbalg |
| D268,056 S | 2/1983 | Campbell-Kelly et al. |
| D268,362 S | 3/1983 | Wong |
| 4,389,975 A | 6/1983 | Fisher, Jr. |
| D272,507 S | 2/1984 | Conti |
| D272,508 S | 2/1984 | Conti |
| 4,444,324 A | 4/1984 | Grenell |
| D274,013 S | 5/1984 | Sun |
| D274,563 S | 7/1984 | Blasbalg |
| 4,466,376 A | 8/1984 | Wells |
| D276,510 S | 11/1984 | Bent et al. |
| D277,514 S | 2/1985 | Bescherer |
| D277,739 S | 2/1985 | Grammas et al. |
| D278,168 S | 3/1985 | Latham et al. |
| D278,751 S | 5/1985 | Seager |
| D282,019 S | 12/1985 | Kilham |
| D284,033 S | 5/1986 | Brodsky |
| D285,840 S | 9/1986 | Poon |
| D289,143 S | 4/1987 | Guillaume |
| D289,210 S | 4/1987 | Tucker et al. |
| D289,211 S | 4/1987 | Riha |
| 4,664,066 A | 5/1987 | Steuernagel et al. |
| D290,769 S | 7/1987 | Taylor |
| D290,773 S | 7/1987 | Liethen |
| 4,682,461 A | 7/1987 | Sizemore |
| D292,372 S | 10/1987 | Sykes |
| 4,712,512 A | 12/1987 | Schrieb et al. |
| 4,732,112 A | 3/1988 | Fenner et al. |
| 4,738,221 A | 4/1988 | Nock |
| D297,074 S | 8/1988 | Burke et al. |
| 4,798,172 A | 1/1989 | Clarke |
| D299,770 S | 2/1989 | Coffer |
| 4,821,681 A | 4/1989 | Tucker |
| D300,882 S | 5/1989 | Olson |
| 4,896,628 A | 1/1990 | Kadunce |
| 4,901,673 A | 2/1990 | Overstreet |
| 4,938,168 A | 7/1990 | Meidell |
| D309,858 S | 8/1990 | Meyersburg |
| D313,169 S | 12/1990 | Scott et al. |
| 4,974,547 A | 12/1990 | Graham |
| 4,986,219 A | 1/1991 | Harris |
| 4,989,548 A | 2/1991 | Short et al. |
| 4,996,947 A | 3/1991 | Petrides |
| 5,033,411 A | 7/1991 | Brucker |
| D324,436 S | 3/1992 | Embree |
| 5,094,417 A | 3/1992 | Creed |
| 5,105,765 A * | 4/1992 | Loken ........................ 119/57.9 |
| D326,003 S | 5/1992 | Embree |
| D326,286 S | 5/1992 | Kerivan |
| 5,115,343 A | 5/1992 | Bennett |
| 5,140,945 A | 8/1992 | Barnhart et al. |
| D329,892 S | 9/1992 | Brister |
| 5,168,830 A | 12/1992 | Deglis |
| D334,133 S | 3/1993 | Hartzheim |
| 5,191,857 A | 3/1993 | Boaz |
| D334,635 S | 4/1993 | Wenstrand |
| D335,006 S | 4/1993 | Blasbalg |
| 5,207,180 A | 5/1993 | Graham |
| D337,271 S | 7/1993 | Pezzoli et al. |
| D338,317 S | 8/1993 | Woodward |
| 5,247,904 A | 9/1993 | Anderson |
| 5,255,631 A | 10/1993 | Anderson |
| 5,265,557 A | 11/1993 | Lovitz |
| 5,269,242 A | 12/1993 | Toldi |
| D343,030 S | 1/1994 | Harwick, Jr. |
| 5,289,796 A | 3/1994 | Armstrong |
| 5,291,855 A | 3/1994 | Laverty |
| D349,981 S | 8/1994 | Fasino |
| D351,691 S | 10/1994 | Lipton |
| D351,692 S | 10/1994 | Cossey |
| D352,575 S | 11/1994 | Bransky et al. |
| D352,787 S | 11/1994 | Hulse |
| 5,361,723 A | 11/1994 | Burleigh |
| D354,079 S | 1/1995 | Shapiro |
| D360,495 S | 7/1995 | Sanderson |
| D360,829 S | 8/1995 | Leeds |
| D365,893 S | 1/1996 | Thorp |
| D366,413 S | 1/1996 | Tober |
| 5,479,879 A | 1/1996 | Biek |
| 5,490,480 A | 2/1996 | Dumond |
| D370,313 S | 5/1996 | Nottingham et al. |

(56) References Cited

U.S. PATENT DOCUMENTS

| | | |
|---|---|---|
| D370,315 S | 5/1996 | Miller |
| D371,226 S | 6/1996 | Lee |
| D371,227 S | 6/1996 | Lee |
| D371,230 S | 6/1996 | Nottingham et al. |
| D371,979 S | 7/1996 | Nottingham et al. |
| 5,533,467 A | 7/1996 | Lancia |
| 5,558,040 A | 9/1996 | Colwell et al. |
| D376,731 S | 12/1996 | Lin |
| D380,066 S | 6/1997 | Green et al. |
| 5,655,477 A | 8/1997 | Hoffman et al. |
| D383,878 S | 9/1997 | Merino et al. |
| D384,443 S | 9/1997 | Olfert |
| D384,505 S | 10/1997 | Stewart |
| D386,834 S | 11/1997 | Nissim et al. |
| D386,835 S | 11/1997 | Passamare |
| D386,836 S | 11/1997 | Hunt |
| 5,682,835 A | 11/1997 | Walter et al. |
| D388,312 S | 12/1997 | Sorkin |
| 5,701,841 A | 12/1997 | Fasino |
| 5,711,247 A | 1/1998 | Henshaw |
| D390,490 S | 2/1998 | Ruderick |
| 5,729,949 A | 3/1998 | Hartzheim |
| 5,775,256 A | 7/1998 | Henshaw |
| 5,782,200 A | 7/1998 | Knowles et al. |
| D397,529 S | 8/1998 | Fuller et al. |
| D399,611 S | 10/1998 | Ericson et al. |
| 5,829,382 A | 11/1998 | Garrison |
| D406,307 S | 3/1999 | Kang |
| D408,420 S | 4/1999 | Buter |
| 5,947,054 A * | 9/1999 | Liethen .......... 119/57.9 |
| D414,901 S | 10/1999 | Cirelli |
| D420,176 S | 2/2000 | Heinzeroth |
| D421,709 S | 3/2000 | Haslem et al. |
| D425,259 S | 5/2000 | Lang |
| 6,079,361 A | 6/2000 | Bowell et al. |
| D428,437 S | 7/2000 | Hmelar et al. |
| D428,537 S | 7/2000 | Miller |
| 6,095,087 A | 8/2000 | Bloedorn |
| 6,119,627 A * | 9/2000 | Banyas et al. .......... 119/57.9 |
| D431,760 S | 10/2000 | Sullivan |
| D433,633 S | 11/2000 | La Fata |
| 6,145,477 A | 11/2000 | Jansen |
| D434,980 S | 12/2000 | Suziki |
| D435,666 S | 12/2000 | Barsomain |
| D440,361 S | 4/2001 | Colwell |
| 6,213,054 B1 | 4/2001 | Marshall |
| 6,253,706 B1 | 7/2001 | Sloop |
| D448,290 S | 9/2001 | Schultz et al. |
| 6,305,321 B1 | 10/2001 | Potente |
| D451,251 S | 11/2001 | Chrisco et al. |
| D452,929 S | 1/2002 | Perelli |
| 6,360,690 B1 | 3/2002 | Canby |
| 6,408,788 B1 | 6/2002 | Lieb et al. |
| D459,840 S | 7/2002 | Lian |
| 6,415,737 B2 * | 7/2002 | Banyas et al. .......... 119/57.9 |
| 6,418,878 B1 | 7/2002 | Cathell et al. |
| D461,827 S | 8/2002 | Koebbe |
| 6,427,629 B1 | 8/2002 | Lush |
| D462,172 S | 9/2002 | Aurelio, Jr. |
| D462,286 S | 9/2002 | Perelli |
| 6,450,120 B1 | 9/2002 | Nylen |
| 6,457,439 B1 | 10/2002 | Engelking |
| D466,255 S | 11/2002 | Kuelbs |
| D466,656 S | 12/2002 | Kuelbs et al. |
| D467,513 S | 12/2002 | Neff |
| D468,368 S | 1/2003 | Jones |
| D470,630 S | 2/2003 | Kuelbs |
| D471,327 S | 3/2003 | Kuelbs |
| D472,490 S | 4/2003 | Perelli |
| 6,543,384 B2 | 4/2003 | Cote |
| 6,546,894 B2 | 4/2003 | Chrisco et al. |
| D475,128 S | 5/2003 | Svendsen et al. |
| 6,561,128 B1 | 5/2003 | Carter |
| 6,584,933 B1 | 7/2003 | Stone |
| 6,591,781 B2 | 7/2003 | Hardison |
| D478,475 S | 8/2003 | Backes et al. |
| 6,622,654 B2 * | 9/2003 | Fasino .......... 119/57.9 |
| D480,291 S | 10/2003 | Sorkin |
| D482,262 S | 11/2003 | Sorkin |
| 6,659,041 B1 | 12/2003 | Curts |
| D485,930 S | 1/2004 | Chen |
| 6,701,867 B1 | 3/2004 | Garrison |
| D490,576 S | 5/2004 | Rich et al. |
| D491,019 S | 6/2004 | Marsden et al. |
| D491,443 S | 6/2004 | Lowery |
| D493,053 S | 7/2004 | Snell |
| D495,900 S | 9/2004 | Mayse |
| 6,789,916 B2 | 9/2004 | Ruggles |
| 6,792,891 B1 | 9/2004 | Coburn et al. |
| D497,226 S | 10/2004 | Nauert |
| D497,406 S | 10/2004 | King |
| D497,458 S | 10/2004 | Nauert |
| D499,515 S | 12/2004 | Schulze et al. |
| D500,243 S | 12/2004 | Turek |
| 6,830,009 B1 | 12/2004 | Kuelbs |
| D500,668 S | 1/2005 | Kelly et al. |
| D503,019 S | 3/2005 | Swift et al. |
| 6,863,024 B1 | 3/2005 | Obenshain |
| 6,866,004 B1 | 3/2005 | Lush |
| D504,547 S | 4/2005 | Nauert |
| D504,746 S | 5/2005 | Lee |
| D505,521 S | 5/2005 | Schrodt |
| D505,755 S | 5/2005 | Lundstrom et al. |
| 6,901,882 B2 | 6/2005 | Kuelbs |
| D509,325 S | 9/2005 | Jung et al. |
| 6,945,192 B2 | 9/2005 | Cote |
| D511,866 S | 11/2005 | Lundstrom et al. |
| D512,661 S | 12/2005 | Morris et al. |
| D512,800 S | 12/2005 | Jung et al. |
| 6,986,322 B2 | 1/2006 | Lumpkin et al. |
| D514,319 S | 2/2006 | King et al. |
| D515,748 S | 2/2006 | Jung et al. |
| D515,916 S | 2/2006 | Bleuer |
| D516,413 S | 3/2006 | Anderson et al. |
| 7,017,517 B2 | 3/2006 | Paquette |
| 7,017,521 B2 | 3/2006 | Kuelbs |
| D518,380 S | 4/2006 | Moran |
| 7,021,241 B2 * | 4/2006 | Nock .......... 119/57.8 |
| 7,032,538 B1 | 4/2006 | Lush |
| 7,032,539 B1 | 4/2006 | Obenshain |
| D522,180 S | 5/2006 | Goria, II |
| D523,141 S | 6/2006 | Massey |
| D524,490 S | 7/2006 | Obenshain |
| 7,086,352 B2 | 8/2006 | Goodger |
| 7,096,821 B2 | 8/2006 | Ruff |
| D535,445 S | 1/2007 | Obenshain |
| 7,168,392 B2 | 1/2007 | Kuelbs |
| 7,185,605 B1 | 3/2007 | Lush |
| D540,349 S | 4/2007 | Waki |
| D542,659 S | 5/2007 | Meether et al. |
| D542,982 S | 5/2007 | Wendell |
| D543,256 S | 5/2007 | Chen |
| D544,942 S | 6/2007 | Chen |
| 7,234,416 B2 | 6/2007 | Hoff |
| D548,587 S | 8/2007 | DuVal et al. |
| 7,258,075 B1 | 8/2007 | Jones et al. |
| 7,261,056 B2 | 8/2007 | Hunter et al. |
| D551,952 S | 10/2007 | Palmer |
| 7,278,613 B2 | 10/2007 | Roy |
| 7,287,486 B2 | 10/2007 | Hunter |
| D556,568 S | 12/2007 | DuVal |
| D557,595 S | 12/2007 | Ernst et al. |
| 7,302,911 B1 | 12/2007 | Lush |
| D558,567 S | 1/2008 | Ismert |
| D561,021 S | 2/2008 | DuVal et al. |
| D561,040 S | 2/2008 | Sequeira |
| D567,098 S | 4/2008 | Sequeira |
| D568,754 S | 5/2008 | Sequeira |
| 7,370,607 B2 | 5/2008 | O'Dell |
| 7,373,901 B2 | 5/2008 | Baynard |
| D575,118 S | 8/2008 | Bignon |
| D575,591 S | 8/2008 | Bonetti |
| 7,409,922 B1 | 8/2008 | Baynard et al. |
| D578,379 S | 10/2008 | Sorkin |

(56) References Cited

U.S. PATENT DOCUMENTS

| | | | |
|---|---|---|---|
| D578,870 S | 10/2008 | Sorkin | |
| D581,183 S | 11/2008 | Kutscha et al. | |
| D581,259 S | 11/2008 | Portz | |
| 7,448,346 B1* | 11/2008 | Stone et al. | 119/52.3 |
| 7,451,580 B2 | 11/2008 | Kelly et al. | |
| 7,469,656 B2 | 12/2008 | Hunter et al. | |
| 7,484,475 B2 | 2/2009 | Milliner | |
| 7,503,282 B1 | 3/2009 | Lush | |
| 7,506,611 B1 | 3/2009 | Lush | |
| D590,541 S | 4/2009 | Chaoui | |
| 7,516,716 B2 | 4/2009 | Puckett et al. | |
| D591,589 S | 5/2009 | Myers et al. | |
| D592,046 S | 5/2009 | Myers et al. | |
| D592,362 S | 5/2009 | Rutherford et al. | |
| 7,530,330 B1 | 5/2009 | Valle | |
| D594,737 S | 6/2009 | Kelly et al. | |
| 7,540,260 B2 | 6/2009 | Rich et al. | |
| 7,540,262 B2 | 6/2009 | Kuelbs | |
| 7,549,394 B2* | 6/2009 | Nock | 119/57.8 |
| D596,033 S | 7/2009 | Zach et al. | |
| D599,159 S | 9/2009 | Stein | |
| D600,099 S | 9/2009 | Dahlin | |
| 7,610,875 B2 | 11/2009 | Webber | |
| D606,447 S | 12/2009 | West et al. | |
| D606,708 S | 12/2009 | McMullen | |
| D607,612 S | 1/2010 | Yang | |
| D609,064 S | 2/2010 | Najaryn et al. | |
| D609,864 S | 2/2010 | Tsai | |
| 7,654,225 B2 | 2/2010 | Madsen et al. | |
| D612,108 S | 3/2010 | Torres et al. | |
| D612,730 S | 3/2010 | Rushe | |
| 7,669,553 B2 | 3/2010 | White et al. | |
| D614,019 S | 4/2010 | Goodman et al. | |
| D616,040 S | 5/2010 | Spencer | |
| D616,288 S | 5/2010 | Simon et al. | |
| 7,721,677 B1 | 5/2010 | McClaskey | |
| 7,726,259 B2 | 6/2010 | Hepp et al. | |
| 7,739,982 B2* | 6/2010 | Cote | 119/57.9 |
| 7,743,732 B2 | 6/2010 | Webber | |
| D620,074 S | 7/2010 | Muhlenbruck | |
| D621,241 S | 8/2010 | Mirer et al. | |
| D621,268 S | 8/2010 | Morabito | |
| D622,910 S | 8/2010 | Puckett | |
| D623,805 S | 9/2010 | Vosbikian | |
| 7,798,099 B2 | 9/2010 | Vosbikian | |
| 7,874,264 B2 | 1/2011 | McMullen | |
| D632,952 S | 2/2011 | Dablemont | |
| D635,844 S | 4/2011 | Boothby | |
| D636,238 S | 4/2011 | Elmelund | |
| 7,930,994 B2 | 4/2011 | Stone et al. | |
| D638,501 S | 5/2011 | Fishman | |
| D638,588 S | 5/2011 | Vosbikian | |
| 7,958,845 B2 | 6/2011 | Gardner | |
| D643,442 S | 8/2011 | Sato et al. | |
| D643,855 S | 8/2011 | Taniguchi et al. | |
| D644,090 S | 8/2011 | Sittig | |
| 7,997,434 B2 | 8/2011 | Benetti | |
| 8,006,642 B2 | 8/2011 | Vosbikian | |
| 8,028,940 B2 | 10/2011 | Kelly et al. | |
| D649,299 S | 11/2011 | Lush | |
| D649,302 S | 11/2011 | Hickok | |
| D650,261 S | 12/2011 | McDuff et al. | |
| 8,070,380 B2 | 12/2011 | Pucillo et al. | |
| D652,059 S | 1/2012 | Sato et al. | |
| D656,690 S | 3/2012 | Tu | |
| D657,399 S | 4/2012 | Nemoto | |
| 8,156,894 B1 | 4/2012 | Krah | |
| D658,684 S | 5/2012 | Roman | |
| D661,573 S | 6/2012 | Paik et al. | |
| D664,307 S | 7/2012 | Krueger et al. | |
| D664,437 S | 7/2012 | Barel | |
| 8,230,809 B2 | 7/2012 | Cote | |
| 8,245,666 B2 | 8/2012 | Sena et al. | |
| D667,294 S | 9/2012 | Wang | |
| 8,272,607 B2 | 9/2012 | Bonnema | |
| 8,276,541 B2 | 10/2012 | LoRocco et al. | |
| D671,276 S | 11/2012 | Krueger | |
| D671,277 S | 11/2012 | Vosbikian et al. | |
| D671,692 S | 11/2012 | Carter | |
| 8,347,818 B2 | 1/2013 | Cowger et al. | |
| D676,614 S | 2/2013 | Fields et al. | |
| D677,016 S | 2/2013 | Carter | |
| D678,625 S | 3/2013 | Carter et al. | |
| D678,626 S | 3/2013 | Krueger | |
| D678,627 S | 3/2013 | Carter | |
| D678,628 S | 3/2013 | Krueger | |
| D679,059 S | 3/2013 | Carter | |
| D679,453 S | 4/2013 | Krueger et al. | |
| 8,413,605 B2 | 4/2013 | Baynard et al. | |
| 2003/0033985 A1 | 2/2003 | Hardison | |
| 2003/0136347 A1* | 7/2003 | Fasino | 119/57.9 |
| 2003/0226514 A1 | 12/2003 | Cote | |
| 2004/0098942 A1 | 5/2004 | Lee et al. | |
| 2004/0216684 A1 | 11/2004 | Obenshain | |
| 2004/0231606 A1* | 11/2004 | Nock | 119/57.8 |
| 2004/0250777 A1 | 12/2004 | Stachowiak | |
| 2004/0261726 A1 | 12/2004 | Lumpkin | |
| 2005/0120967 A1 | 6/2005 | Ruff | |
| 2005/0257749 A1 | 11/2005 | Kuelbs | |
| 2005/0263085 A1* | 12/2005 | Rich | 119/57.8 |
| 2006/0225658 A1* | 10/2006 | Baynard | 119/57.8 |
| 2006/0266295 A1 | 11/2006 | McDarren | |
| 2006/0272585 A1 | 12/2006 | O'Dell | |
| 2007/0034160 A1* | 2/2007 | Nock | 119/57.8 |
| 2007/0163506 A1* | 7/2007 | Bloedorn | 119/52.2 |
| 2007/0227453 A1 | 10/2007 | Puckett et al. | |
| 2007/0227454 A1* | 10/2007 | Fahey | 119/57.8 |
| 2007/0266951 A1 | 11/2007 | Berns | |
| 2008/0022936 A1 | 1/2008 | Stone et al. | |
| 2008/0078329 A1 | 4/2008 | Hunter et al. | |
| 2008/0105206 A1 | 5/2008 | Rich et al. | |
| 2008/0127902 A1 | 6/2008 | Bent et al. | |
| 2008/0134979 A1 | 6/2008 | Crocker | |
| 2008/0210172 A1 | 9/2008 | Waikas | |
| 2008/0276874 A1 | 11/2008 | Evans | |
| 2008/0302304 A1 | 12/2008 | Mayfield | |
| 2009/0020075 A1 | 1/2009 | Wood et al. | |
| 2009/0071408 A1 | 3/2009 | Wechsler | |
| 2009/0223456 A1* | 9/2009 | Hunter et al. | 119/53 |
| 2009/0260576 A1 | 10/2009 | Vosbikian | |
| 2009/0283046 A1 | 11/2009 | Black | |
| 2009/0304900 A1 | 12/2009 | Augustin | |
| 2010/0061091 A1 | 3/2010 | Galipeau et al. | |
| 2010/0089330 A1* | 4/2010 | McMullen | 119/52.3 |
| 2010/0258054 A1 | 10/2010 | Frazier | |
| 2010/0288200 A1 | 11/2010 | Lush | |
| 2011/0067637 A1 | 3/2011 | Baynard | |
| 2011/0073043 A1 | 3/2011 | Dault | |
| 2011/0083609 A1 | 4/2011 | Cote | |
| 2011/0180004 A1 | 7/2011 | Humphries et al. | |
| 2011/0226186 A1 | 9/2011 | Hunter et al. | |
| 2012/0037080 A1 | 2/2012 | Hepp et al. | |
| 2012/0055410 A1 | 3/2012 | Cote | |
| 2012/0234249 A1* | 9/2012 | Gaze | 119/57.8 |

OTHER PUBLICATIONS

Response to Final Office Action, U.S. Appl. No. 13/107,841, filed Jul. 8, 2013, 10 pages.
Ex Parte Quayle Action, Design U.S. Appl. No. 29/387,515, mailed Jun. 20, 2012, 5 pages.
Ex Parte Quayle Action, Design U.S. Appl. No. 29/390,071, mailed Dec. 20, 2011, 4 pages.
Final Office Action, U.S. Appl. No. 13/107,841, mailed Jan. 9, 2013, 22 pages.
Final Quayle Action, Design U.S. Appl. No. 29/387,515, mailed Aug. 28, 2012, 5 pages.
Non-Final Office Action, Design U.S. Appl. No. 29/387,517, mailed Mar. 12, 2012, 7 pages.
Non-Final Office Action, U.S. Appl. No. 13/107,841, mailed Jun. 27, 2012, 9 pages.
Non-Final Office Action, U.S. Appl. No. 29/387,516, mailed Jul. 6, 2012, 7 pages.

(56) References Cited

OTHER PUBLICATIONS

Notice of Allowance, Design U.S. Appl. No. 29/387,519, mailed Sep. 13, 2012, 11 pages.
Notice of Allowance, Design U.S. Appl. No. 29/387,520, mailed Jun. 15, 2012, 10 pages.
Notice of Allowance, Design U.S. Appl. No. 29/387,517, mailed Jul. 3, 2012, 11 pages.
Notice of Allowance, Design U.S. Appl. No. 29/390,071, mailed Mar. 26, 2012, 7 pages.
Notice of Allowance, Design U.S. Appl. No. 29/427,461, mailed Oct. 4, 2012, 15 pages.
Notice of Allowance, U.S. Appl. No. 29/387,515, mailed Dec. 18, 2012, 14 pages.
Notice of Allowance, U.S. Appl. No. 29/387,516, mailed Nov. 13, 2012, 11 pages.
Notice of Allowance, U.S. Appl. No. 29/387,518, mailed Dec. 21, 2012, 24 pages.
Notice of Allowance, U.S. Appl. No. 29/387,520, mailed Dec. 21, 2012, 8 pages.
Notice of Allowance, U.S. Appl. No. 29/416,886, mailed Jan. 10, 2013, 15 pages.
Notice of Allowance, U.S. Appl. No. 29/416,887, mailed Dec. 26, 2012, 15 pages.
Notice of Allowance, U.S. Appl. No. 29/416,890, mailed Dec. 20, 2012, 24 pages.
Response to Ex Parte Quayle Action, Design U.S. Appl. No. 29/390,071, filed Mar. 19, 2012, 20 pages.
Response to Ex Parte Quayle Action, U.S. Appl. No. 29/387,515, filed Aug. 20, 2012, 7 pages.
Response to Final Office Action, Design U.S. Appl. No. 29/387,515, filed Nov. 19, 2012, 4 pages.
Response to Non-Final Office Action, Design U.S. Appl. No. 29/387,516, filed Nov. 6, 2012, 10 pages.
Response to Non-Final Office Action, Design U.S. Appl. No. 29/387,517, filed Jun. 12, 2012, 13 pages.
Response to Non-Final Office Action, U.S. Appl. No. 13/107,841, filed Nov. 27, 2012, 21 pages.
Response to Restriction Requirement, Design U.S. Appl. No. 29/387,519, filed Jul. 5, 2012, 2 pages.
Response to Restriction Requirement, Design U.S. Appl. No. 29/390,071, filed Dec. 12, 2011, 2 pages.
Response to Restriction Requirement, Design U.S. Appl. No. 29/416,890, filed Sep. 4, 2012, 13 pages.
Response to Restriction, Design U.S. Appl. No. 29/387,517, filed Dec. 12, 2011, 2 pages.
Restriction Requirement, Design U.S. Appl. No. 29/387,519, mailed Jun. 13, 2012, 4 pages.
Restriction Requirement, Design U.S. Appl. No. 29/387,517, mailed Oct. 12, 2011, 4 pages.
Restriction Requirement, Design U.S. Appl. No. 29/390,071, mailed Oct. 11, 2011, 4 pages.
Restriction Requirement, Design U.S. Appl. No. 29/416,890 filed Aug. 4, 2012, 5 pages.
U.S. Appl. No. 13/107,841, filed May 13, 2011, Donegan et al.
U.S. Appl. No. 13/420,063, filed Mar. 14, 2012, Carter et al.
U.S. Appl. No. 13/420,086, filed Mar. 14, 2012, Carter et al.
U.S. Appl. No. 29/427,461, filed Jul. 18, 2012, Krueger et al.
U.S. Appl. No. 29/437,619, filed Nov. 19, 2012, Krueger.
U.S. Appl. No. 29/437,624, filed Nov. 19, 2012, Krueger.
U.S. Appl. No. 29/438,289, filed Nov. 28, 2012, Bruno et al.
U.S. Appl. No. 29/438,291, filed Nov. 28, 2012, Bruno et al.
U.S. Appl. No. 29/448,176, filed Mar. 11, 2013, Carter.
U.S. Appl. No. 13/855,523, filed Apr. 2, 2013, Donegan et al.
U.S. Appl. No. 13/901,321, filed May 23, 2013, Carter et al.

* cited by examiner

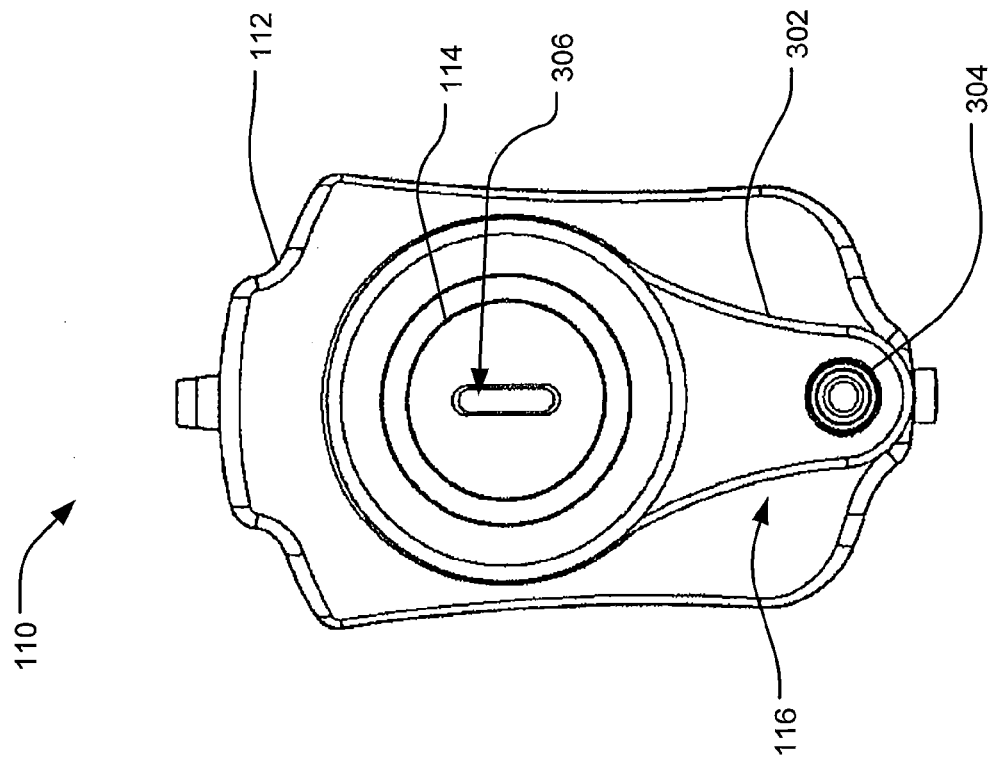
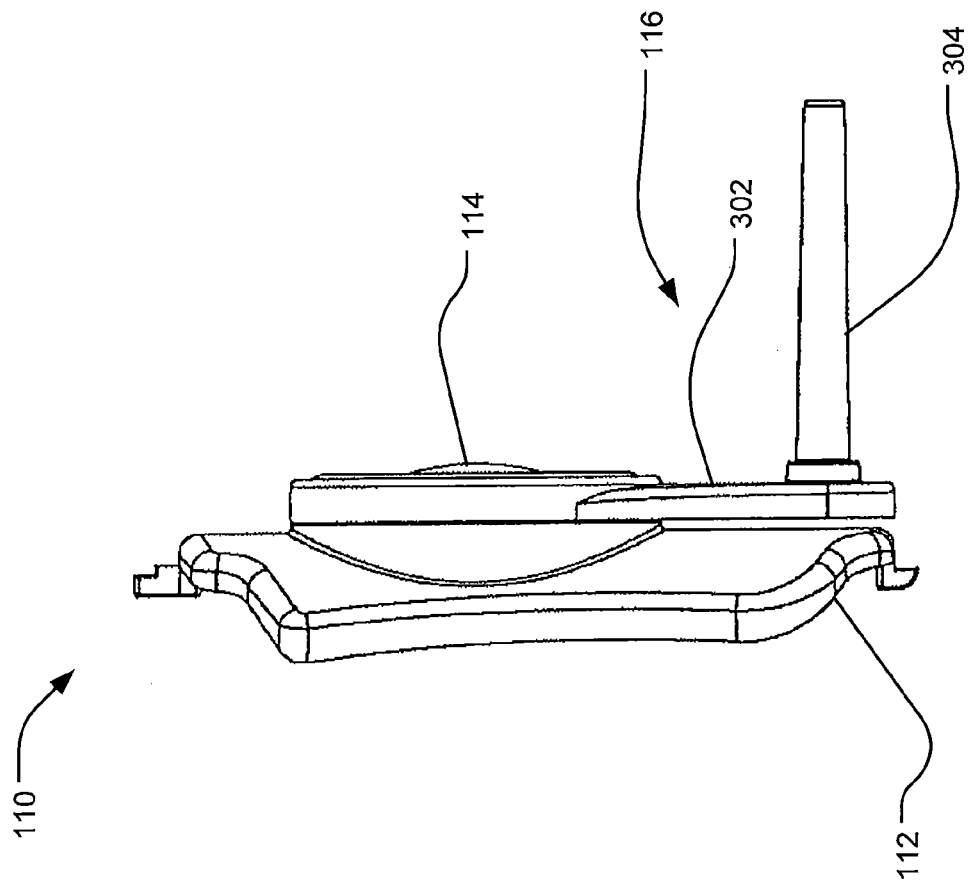
FIG. 8B
FIG. 8A

BIRD FEEDER WITH ROTATING PERCH

CROSS-REFERENCE TO RELATED APPLICATIONS

The present application claims benefit of priority under 35 U.S.C. §119(e) to U.S. Provisional Patent Application No. 61/619,414, entitled "Goldfinch Feeder" and filed on Apr. 2, 2012, specifically incorporated by reference herein for all that it discloses or teaches.

BACKGROUND

Many bird feeders offer a number of fixed perches with corresponding feeding openings positioned relative to each of the perches. However, such bird feeders fail to consider that birds, particularly different species of birds, feed in a variety of positions. For example, the goldfinch often feeds upside down, while the house finch is unable to feed upside down. Accordingly, if an owner desires to attract goldfinches and exclude house finches and other birds, the owner generally must purchase a bird feeder having feeding openings positioned below each perch. However, if the owner changes his mind and wishes to attract house finches and other birds in addition to goldfinches, the owner must generally purchase another bird feeder entirely with feeding openings placed above each perch. Accordingly, many bird feeders fail to take into consideration the variety of positions in which different birds, particularly the goldfinch and house finch, feed.

It is with these observations in mind, among others, that various aspects of the present disclosure were conceived and developed.

BRIEF SUMMARY

Implementations described and claimed herein address the foregoing problems by providing apparatuses and methods for providing different perch positions for feeding birds. In one implementation, a bird feeder includes a reservoir and a perch. The reservoir has an interior configured to hold bird food and an opening in a wall to provide access to the interior of the reservoir. The perch is connected to the wall such that the perch may be moved to a plurality of positions around the opening in the wall.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

FIG. 8A illustrates a side view of the example feeding station of FIG. 3.

FIG. 8B illustrates a front view of the example feeding station of FIG. 3.

DETAILED DESCRIPTION

Aspects of the present disclosure involve apparatuses and methods for providing different perch positions for feeding birds. In one particular aspect, a bird feeder with a rotating perch is provided. The bird feeder includes a reservoir configured to hold bird food. The reservoir has a wall and at least one opening in the wall providing access to the bird food. A feeding station is configured to be mounted on the wall relative to the opening. The feeding station includes a port through which a bird may access the bird food in the reservoir and a perch from which the bird may access the port. The perch is connected to the port such that the perch may be rotated to a plurality of positions relative to the port. The different positions allow birds that feed from different positions to access the bird food and further allow the owner to choose what birds to attract.

Figure 1:
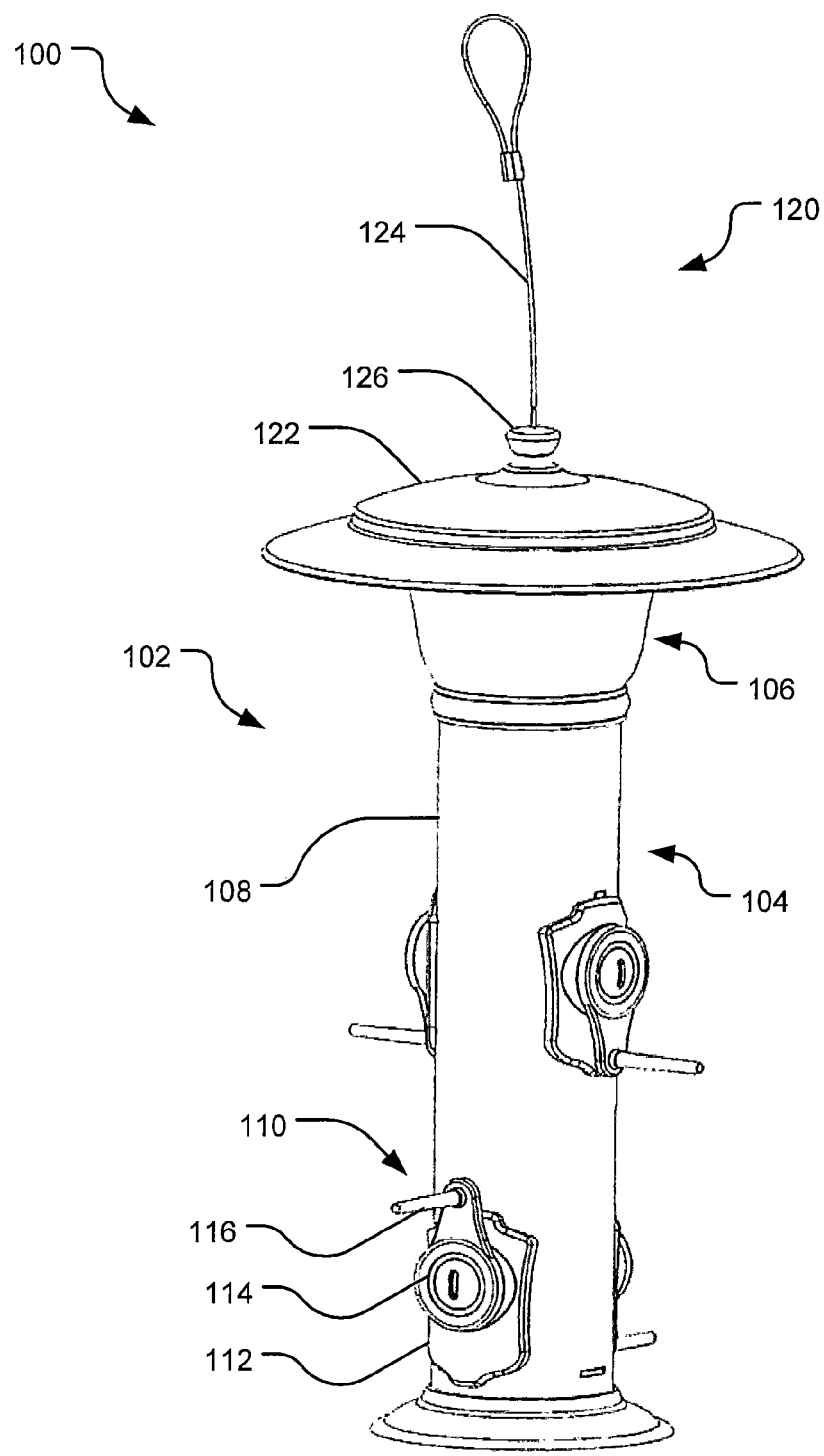
FIG. 1 illustrates a perspective view of an example bird feeder having a rotational perch.

As can be understood from FIG. 1, which shows a perspective view of an example bird feeder 100, a reservoir 102 is configured to hold bird food, which may be a variety of different bird seeds of different sizes. In one implementation, the reservoir 102 includes a tube 104 and a mouth 106. The tube 104 has a generally cylindrical shape and the mouth 106 is tapered to accept bird food with minimal spillage. In one implementation, the mouth 106 and the tube 104 may be formed from a single piece. Stated differently, the tube 104 and the mouth 106 may be substantially one continuous shape. For example, the tube 104 and the mouth 106 may form a single cylindrical shape. Further, the tube 104 and/or the mouth 116 may form other shapes, including but not limited to, rectangular, conical, triangular, elliptical, hexagonal, hemispherical, hemiellipsoidal, cubical, pyramidal, and cylindrical, are contemplated. The tube 104 and/or the mouth 106 may additionally include one or more surfaces (e.g., the wall 108) that may be planar, curved, contoured, angled, and/or the like.

In one implementation, the tube 104 includes the wall 108 having at least one opening providing access to the bird food. The bird feeder 100 includes a feeding station 110 configured to be mounted on the wall 108 relative to the opening. The feeding station 110 includes a perch 116 from which a bird may access the bird food via the opening in the wall 108. In one implementation, the perch 116 may be directly connected to the wall 108 in a manner permitting the perch 116 to be moved (e.g., rotated, slid, turned, etc.) to a plurality of positions around the opening in the wall 108 depending on the type of bird the owner desires to attract. In another implementation, the perch 116 is connected to the wall 108 using a port 112 or similar feature. The port 112 permits a bird to access the bird food in the reservoir 102, and the perch 116 permits the bird to access the port 112. The perch 116 may be connected to the port 112 such that the perch 116 may be moved to a plurality of positions around the port 112.

In some implementations, the feeding station 110 further includes a port plug 114. The port 112 may be configured to receive the port plug 114 to mount the perch 116 on the bird feeder 100 such that the perch 116 may be moved to various positions. In one implementation, the port 112 and the port plug 114 are stationary as the perch 116 moves. In another implementation, the port plug 114 and/or the port 112 move with the perch 116 as the perch 116 is positioned.

The mouth 106 is configured to receive a lid assembly 120 to close or occlude the reservoir 102. In one implementation, the lid assembly 120 includes a lid 122 which extends past the edge of the mouth 106. The lid 122 is held to the mouth 106 by a cable 124, which is attached to the reservoir 102 and passes through the lid 122 at a knob 126. In one implementation, the knob 126 is located at the substantial center of the lid 122. In another implementation, the knob 126 is positioned near a side of the lid 122. The lid assembly 120 may include a plurality of knobs 126, for example, positioned generally opposite another one of the knobs 126. The cable 124 extends upwardly to attach to an item, including, without limitation, a tree limb or a hook.

The bird feeder may include any number of feeding stations, including the feeding station 110, positioned relative to openings in the wall 108. For example, as shown in FIG. 1, the bird feeder 100 may include four feeding stations to accommodate more birds.

Figure 2:
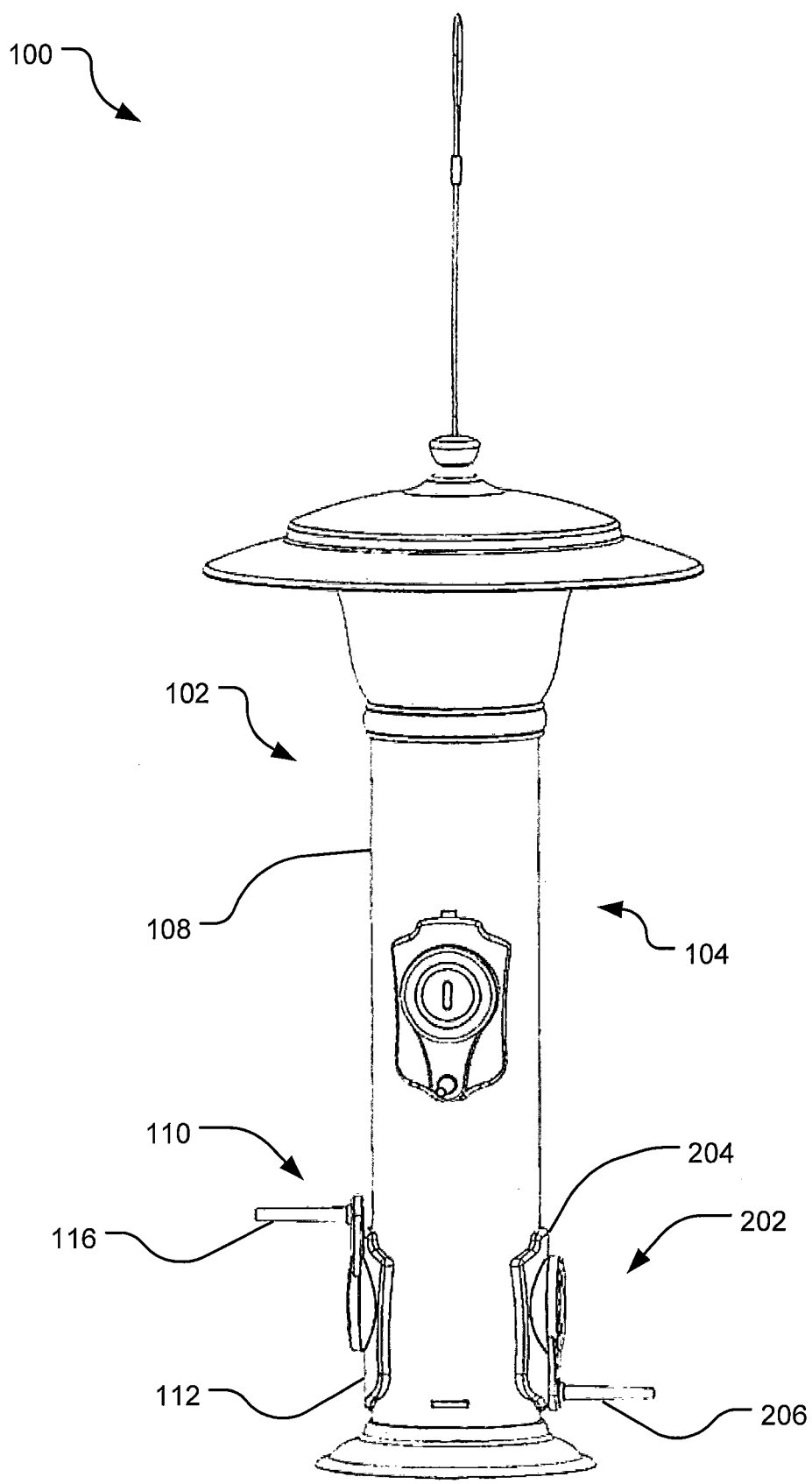
FIG. 2 illustrates another perspective view of the example bird feeder of FIG. 1.

Turning to FIG. 2, the bird feeder 100 may include a second feeding station 202 mounted on the wall 108 generally opposite the feeding station 110. The second feeding station 202 includes a port 204 and a perch 206, as described herein. As can be understood from FIG. 2, the perches 116 and 206 may be moved to a plurality of positions relative to the ports 112 and 204, respectively. For example, the perch 116 is positioned near the top of the port 112, and the perch 206 is positioned near the bottom of the port 204. In one implementation, the ports 112 and 204 are stationary, and the positions of the ports 112 and 204 do not change as the perches 116 and 206 are moved.

If an owner desires to attract goldfinches and exclude house finches and other birds, a perch of each feeding station of the bird feeder 100 are moved to the position of the perch 116, as shown in FIG. 2. Specifically, each of the perches is moved to a position near the top of the ports (e.g., the position of the perch 116 shown in FIG. 2). However, if the owner desires to attract house finches and other birds, the perches may be moved to a position near the bottom of the ports (e.g., the position of the perch 206 shown in FIG. 2). The owner may also position the perches such that a first portion of the perches attract goldfinches and exclude other birds, including house finches, and a second portion of the perches attract house finches and other birds in addition to gold finches.

Figure 3:
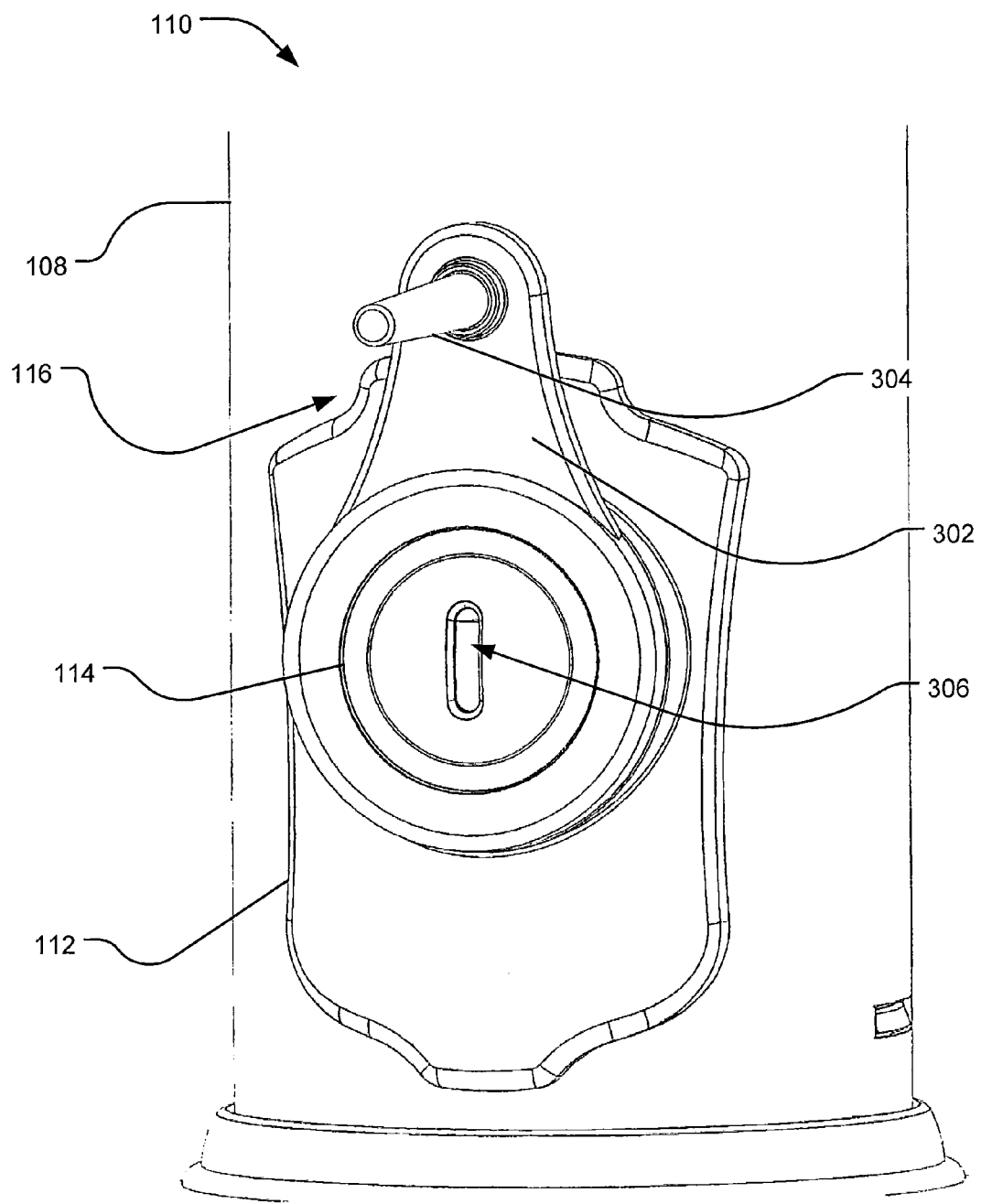
FIG. 3 illustrates an example feeding station having a rotational perch.

As shown in FIG. 3, the feeding station 110 is removably mounted on the wall 108. In one implementation, the feeding station 110 includes the port 112 and the perch 116, as described herein. The perch 116 includes a surface 302 and a projecting portion 304 that extends from the surface 302. The surface 302 may be a variety of shapes or designs. The surface 302 may further include additional planar, contoured angled, textured surfaces. The projecting portion 304 may extend in a variety of manners, including, but not limited to, linear, angled, contoured, or the like. The port 112 is configured to attach the perch 116 to the wall 108 relative to an opening through which bird food may be accessed. Once the perch 116 is attached to the wall 108, the projecting portion 304 extends generally outwardly from the wall 108.

In one implementation, the feeding station further includes the port plug 114. The port 112 may be configured to receive the port plug 114. As described with respect to FIG. 7, the perch 116 may be disposed between the port 112 and the port plug 114, thereby attaching the perch 116 to the port 112. In another implementation, the port 112 is adapted to receive and engage the perch 116 directly.

The port plug 114 includes at least one access opening 306 sized to permit limited access to bird food held in the reservoir 102. For example, the bird food held in the reservoir 102 may be thistle seed, so the access opening 306 may be sized to permit limited access to thistle seed. In one implementation, the access opening 306 is approximately 9.6 mm tall and approximately 2.3 mm wide. However, other dimensions of the access opening 306 are contemplated depending, for example, on the size of the bird food held in the reservoir 102. In one implementation, the port plug 114 is positioned near the approximate center of the port plug 114 and/or the port 112. A plurality of access openings similar to the access opening 306 may be present on the port plug 114 or elsewhere on the feeding station 110 to permit a bird to access the bird food in the reservoir.

The perch 116 may be attached to the port 112, such that the perch 116 may be rotated or otherwise moved relative to the port 112. In one implementation, as the perch 115 is moved between a plurality of positions, the projecting portion 304 of the perch 116 is located at a constant distance relative to the access opening 306. For example, the projecting portion 304 may be consistently located approximately 34 mm away from the access opening 306.

Figure 4:
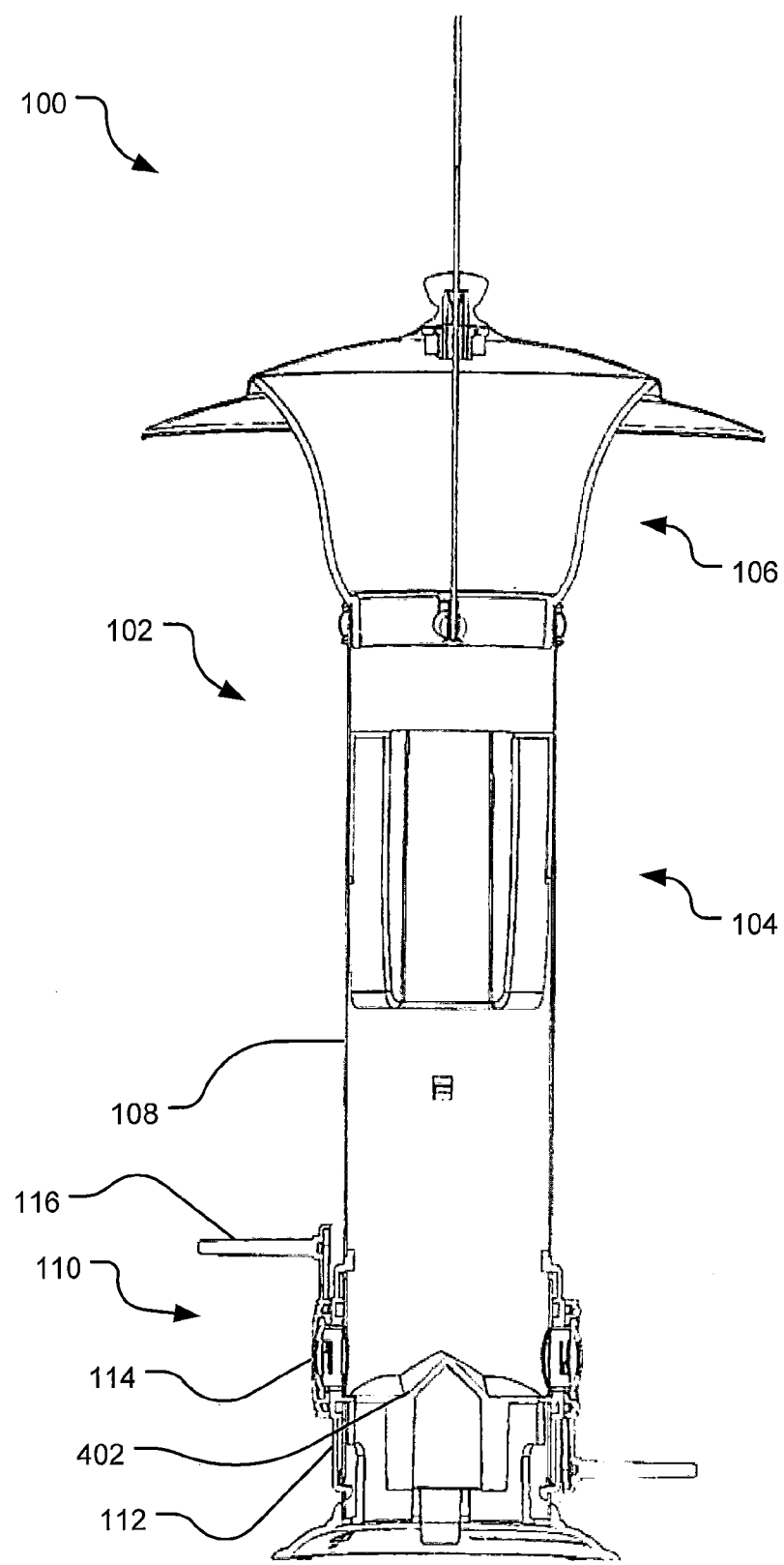
FIG. 4 illustrates a cross sectional view of the example bird feeder shown in FIG. 2.

As can be understood from FIG. 4, which is a cross sectional view of the bird feeder 100, the reservoir 102 may include one or more receiving portions for collecting bird food in the reservoir 102 and allocating the bird food to the one or more feeding stations. For example, a receiving portion 402 includes one or more angled and/or contoured surfaces to direct bird food to the feeding station 110. In some implementations, the receiving portions are configured to allocate bird food deposited in the reservoir 102 evenly to each of the feeding stations included in the bird feeder 100.

Figure 5:
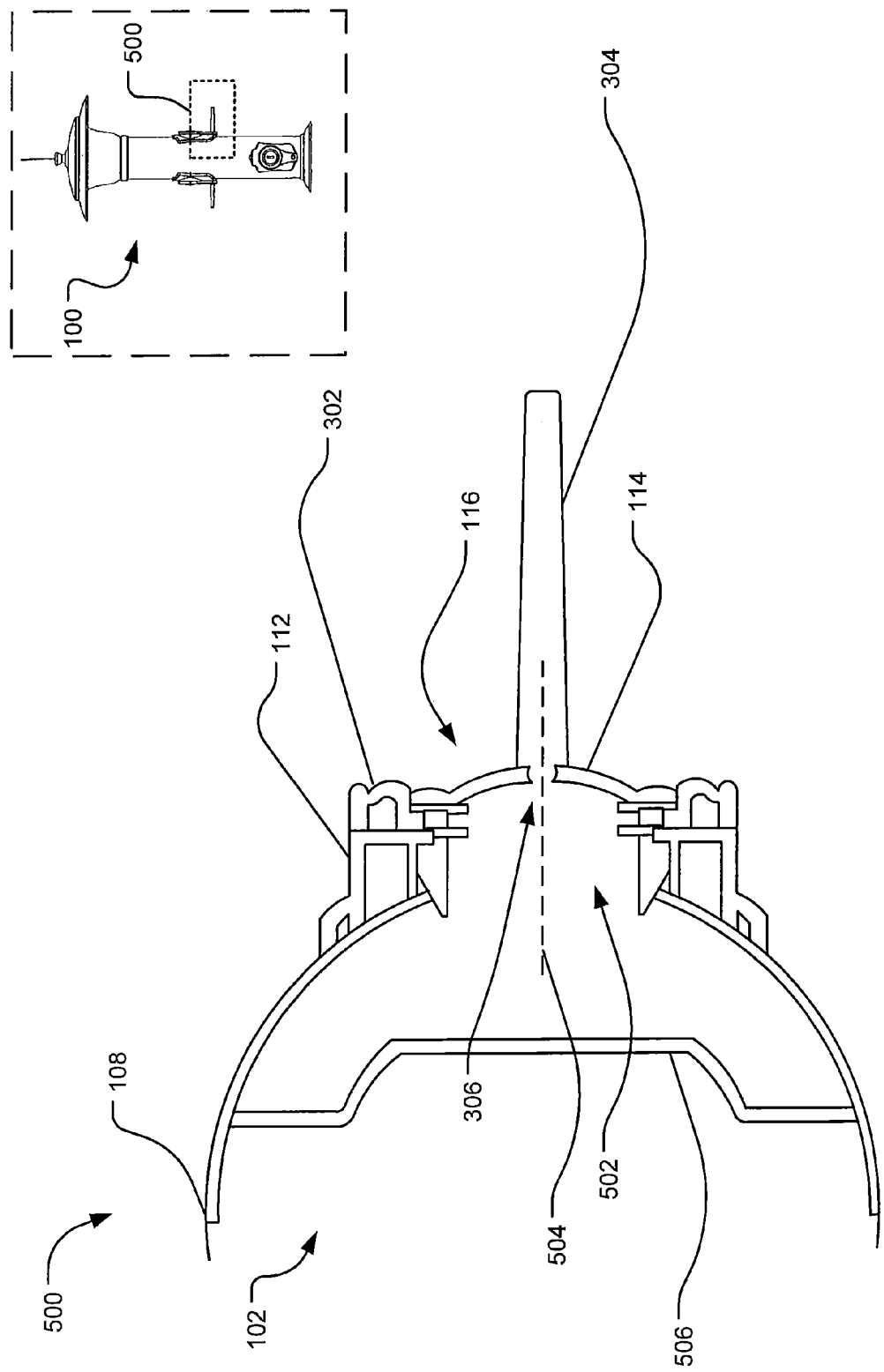
FIG. 5 illustrates a top cross sectional view of an example feeding station having a rotational perch.
Figure 6:
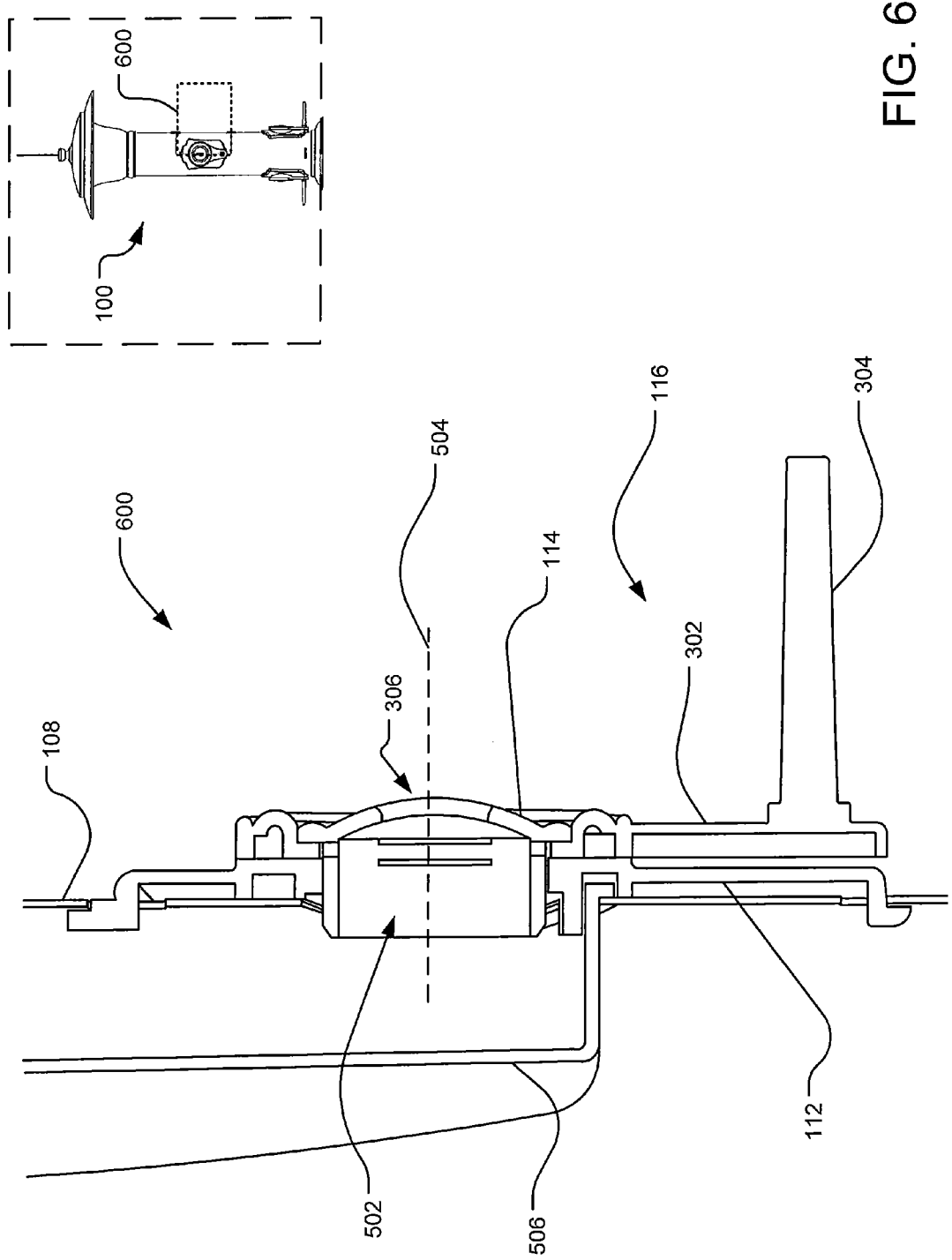
FIG. 6 illustrates a side cross sectional view of an example feeding station having a rotational perch.

FIGS. 5 and 6 show a top cross sectional view 500 and a side cross sectional view 600, respectively, of a feeding station on the bird feeder 100. As described herein, each feeding station may be mounted on the wall 108 relative to an opening 502 in the wall 108 through which the interior of the reservoir 102 may be accessed. The port 112 is mounted on the wall 108 such that the opening 502 is generally not obstructed.

In one implementation, the perch 116 is connected to the port 112 using the port plug 114. Specifically, the port plug 114 snaps into the port 112, thereby piercing the wall 108 and retaining the perch 116. In another implementation, the perch 116 snaps into the port 112 or the wall 108, such that the perch 116 may move (e.g., rotate) within a channel in the port 112 or the wall 108.

The surface 302 and the projecting portion 304 of the perch 116 may be rotated about an axis line 504. In one implementation, the axis line 504 lies at an approximate center of the port plug 114, near the access opening 306, an approximate center of the port 112, and/or an approximate center of the opening 502 in the wall 108. As described with respect to FIGS. 7A-C, in one implementation, the port 112 and the port plug 114 remain stationary as the perch 116 is rotated. In another implementation, the port plug 114 and/or the port 112 rotate as the perch 116 rotates.

Further, as described with respect to FIG. 4, the reservoir 102 may include a receiving portion 506 for collecting and allocating bird food to the access opening 306. As shown in FIGS. 5 and 6, the receiving portion 506 may be a substantially thin wall having one or more surfaces for directing bird food to the access opening 306.

Figure 7A:
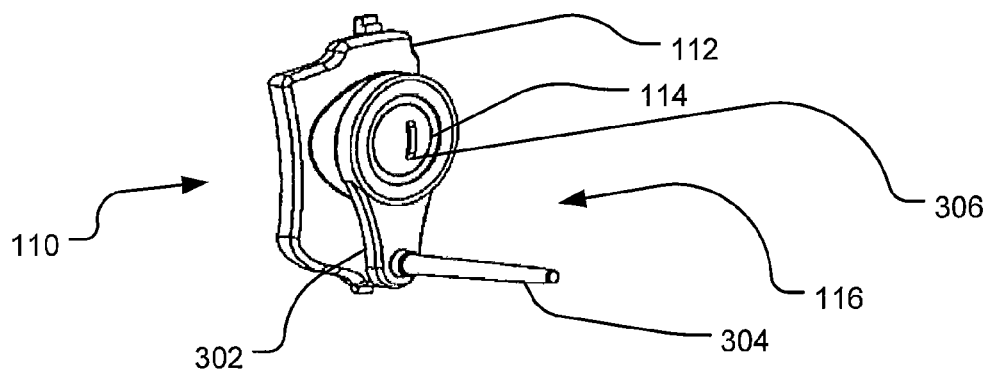
FIGS. 7A-C illustrate three perspective views of an example feeding station showing a perch rotated to various positions.
Figure 7B:
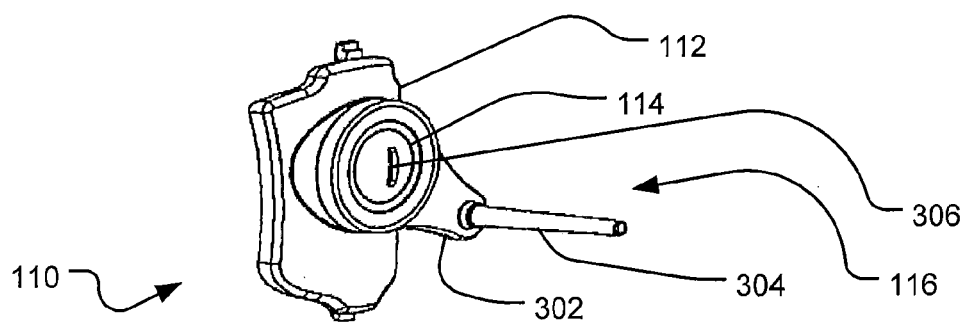
Figure 7C:
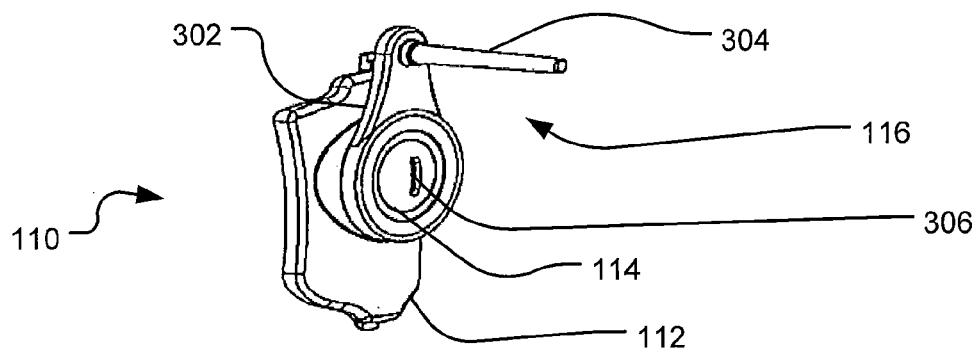

FIGS. 7A-C illustrate three perspective views of the feeding station 110 showing the perch 116 rotated to a plurality of positions about the port 112. FIG. 7A shows the perch 116 rotated such that the surface 302 and the projecting portion 304 are positioned near the bottom of the port 112 and below the access opening 306 on the port plug 114. The position shown in FIG. 7A may be used to attract house finches, other birds, and the goldfinch. FIG. 7B shows the perch 116 as it is rotated counterclockwise towards the top of the port 112. During the rotation, the surface 302 and the projecting portion 304 are positioned at an angle relative to the access opening 306 on the port plug 114. Finally, FIG. 7C shows the perch 116 rotated such that the surface 302 and the projecting portion 304 are positioned near the top of the port 112 and above the access opening 306 on the port plug 114. The position shown in FIG. 7C may be used to attract goldfinches and exclude house finches and other birds. As can be understood from FIGS. 7A-7C, in one implementation, as the perch 116 is rotated, the port 112, the port plug 114, and the access opening 306 remain stationary and are generally not affected by the rotation of the perch 116.

Figure 7D:
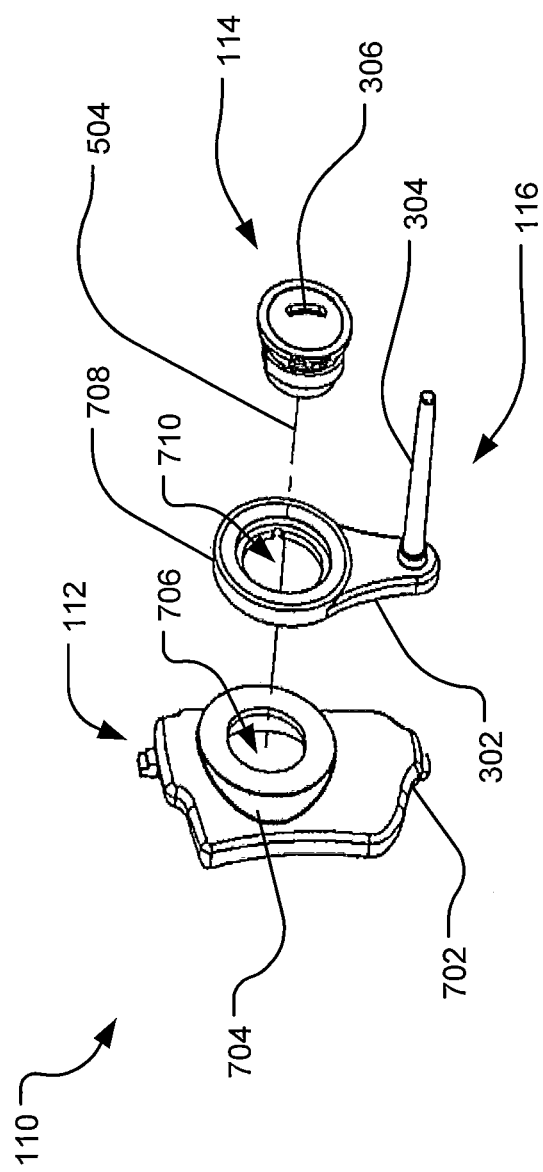
FIG. 7D illustrates an exploded view of the example feeding station.

FIG. 7D illustrates an exploded view of the feeding station 110, which includes the port 112, the perch 116, and the port plug 114. In one implementation, the port 112 includes a surface 702 and a protruding portion 704 extending from the surface 702. The protruding portion 704 defines an opening 706 configured to provide access to the opening 502 in the wall 108. The surface 702 may be shaped to mirror the shape of the wall 108 such that the surface 702 fits snugly against the wall 108 once mounted. The protruding portion 704 has a generally circular shape adapted to provide a planar surface to receive the perch 116. It will be understood by those of ordinary skill in the art that the protruding portion 704 may have a variety of shapes, including, but not limited to, rectangular, elliptical, triangular, and polygonal, and the surface 702 may have a variety of shapes, including shapes that do not mirror the shape of the wall 108.

In one implementation, the perch 116 includes a ring 708 defining an opening 710. The ring 708 is sized relative to the protruding portion 704. For example, the ring 708 may be the same size as the protruding portion 704 such that when the protruding portion 704 is connected to the ring 708, the openings 706 and 710 create substantially one opening. However, in other implementations, the ring 708 is larger or smaller in size compared to the protruding portion 704. In another implementation, the surface 302 extends over the ring 708 to substantially cover the opening 706 of the port 112 when the perch 116 engages the protruding portion 704 of the port 112. The surface 302 may be a variety of shapes and/or designs. The surface 302 may include one or more access openings (e.g., similar to the access opening 306) to provide access to the opening 706. The ring 708 of the perch 116 may engage the protruding portion 704 of the port 112 such that the perch 116 may be moved to a plurality of positions around the opening 706 of the port 112.

In one implementation, the protruding portion 704 is configured to receive the port plug 114 such that the perch 116 is disposed between the port 112 and the port plug 114. The general center of the opening 706 of the port 112 may be positioned near or along the axis 504. The general center of the opening 710 and/or of the surface 302 of the perch 116 may be positioned near or along the axis 504. In one implementation, the axis 504 corresponds to the access opening 306 on the port plug 114. The access opening 306 provides the bird access to the bird food in the reservoir 102 via the openings 706 and 710.

FIGS. 8A and 8B illustrate a side view and a front view, respectively of the feeding station 110. In one implementation, the feeding station 110 includes the port 112 and the perch 116 configured to be mounted on the wall 108 of the reservoir 102 relative to an opening in the wall 108 that permits a bird to access bird food held in the reservoir 102. The perch includes a surface 302 from which a projecting portion 304 extends. In one implementation, the port plug 114 attaches the perch 116 to the port 112 such that the projecting portion 304 may be moved to various positions relative to the access opening 306, as described herein. In another implementation, the perch 116 is attached to the port 112 and/or the wall 108 directly such that the projecting portion 304 may be moved to various positions relative to the opening 502 in the wall 108, as described herein.

Figure 9:
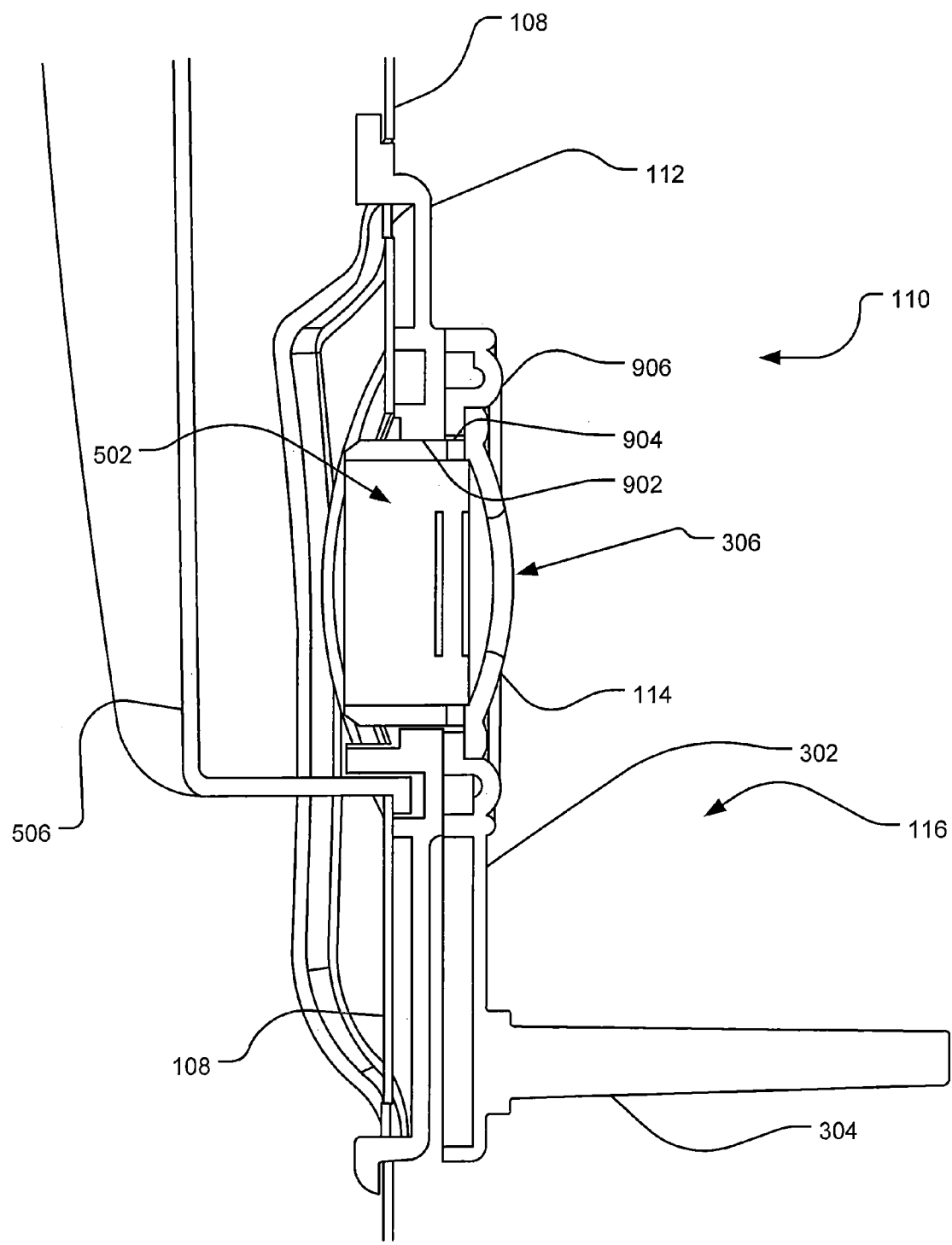
FIG. 9 illustrates another side cross sectional view of an example feeding station having a rotational perch.

As shown in FIG. 9, which is a side cross sectional view, the feeding station 110 is mounted on the wall 108 relative to the opening 502 through which the interior of the reservoir 102 may be accessed. The port 112 is mounted on the wall 108 such that the opening 502 is not obstructed. In one implementation, the perch 116 is connected to the port 112 using the port plug 114. Specifically, the port 112 includes a substantially flat portion 902 configured to engage a channel 904 of the flat portion 902. As described with respect to FIGS. 10-12, a barbed portion 906 is disposed between a portion of the port 112 and a portion of the port plug 114 such that the perch 116 is rotationally mounted to the wall 108. The surface 302 and the projecting portion 304 may then be rotated relative to the access opening 306. In one implementation, the port 112 and the port plug 114 remain in the same position as the perch 116 is rotated. Further as described with respect to FIGS. 4 and 5, the reservoir 102 may include a receiving portion 506 for collecting and allocating bird food to the access opening 306.

Figure 10:
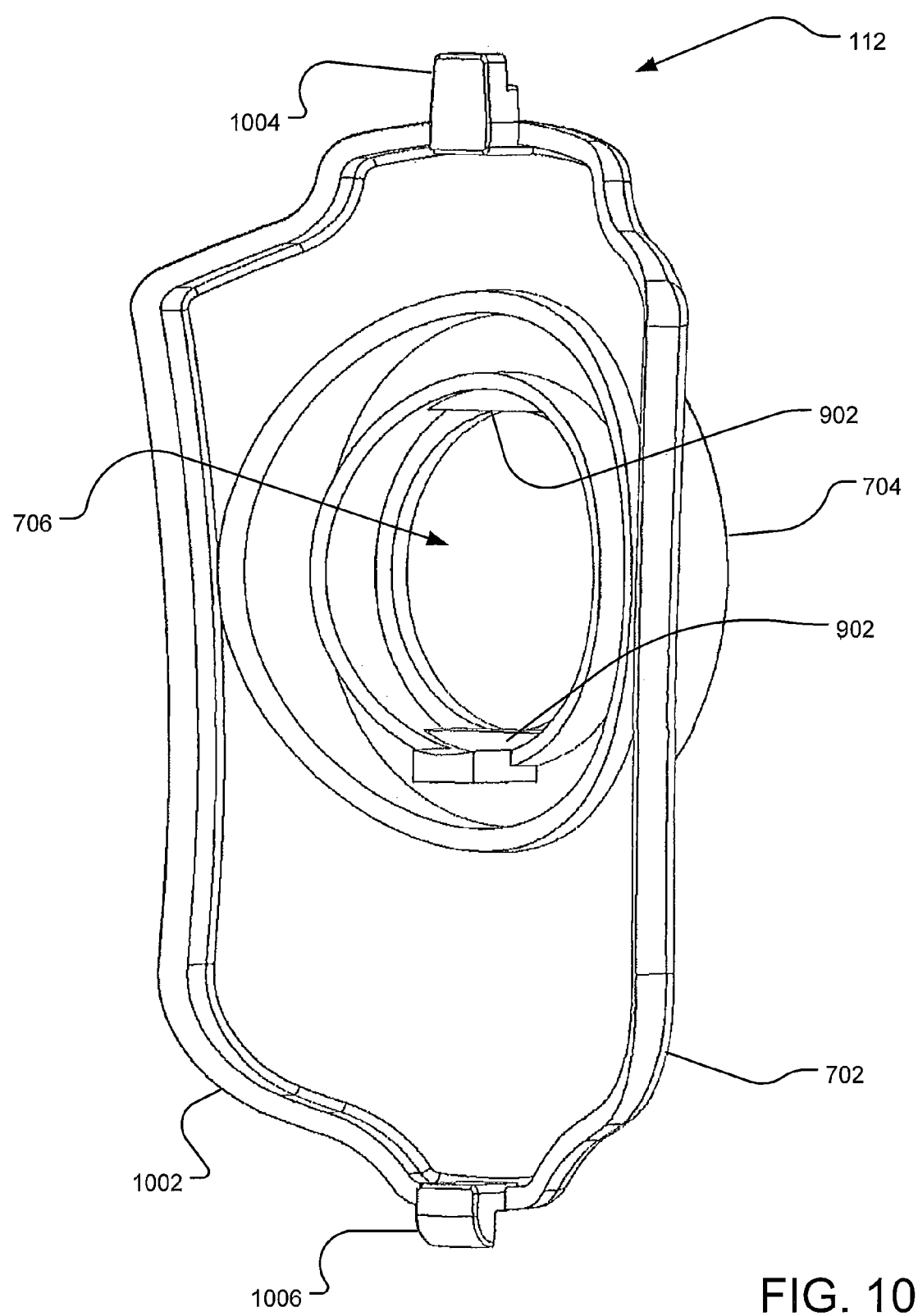
FIG. 10 illustrates a back perspective view of an example port.
Figure 11:
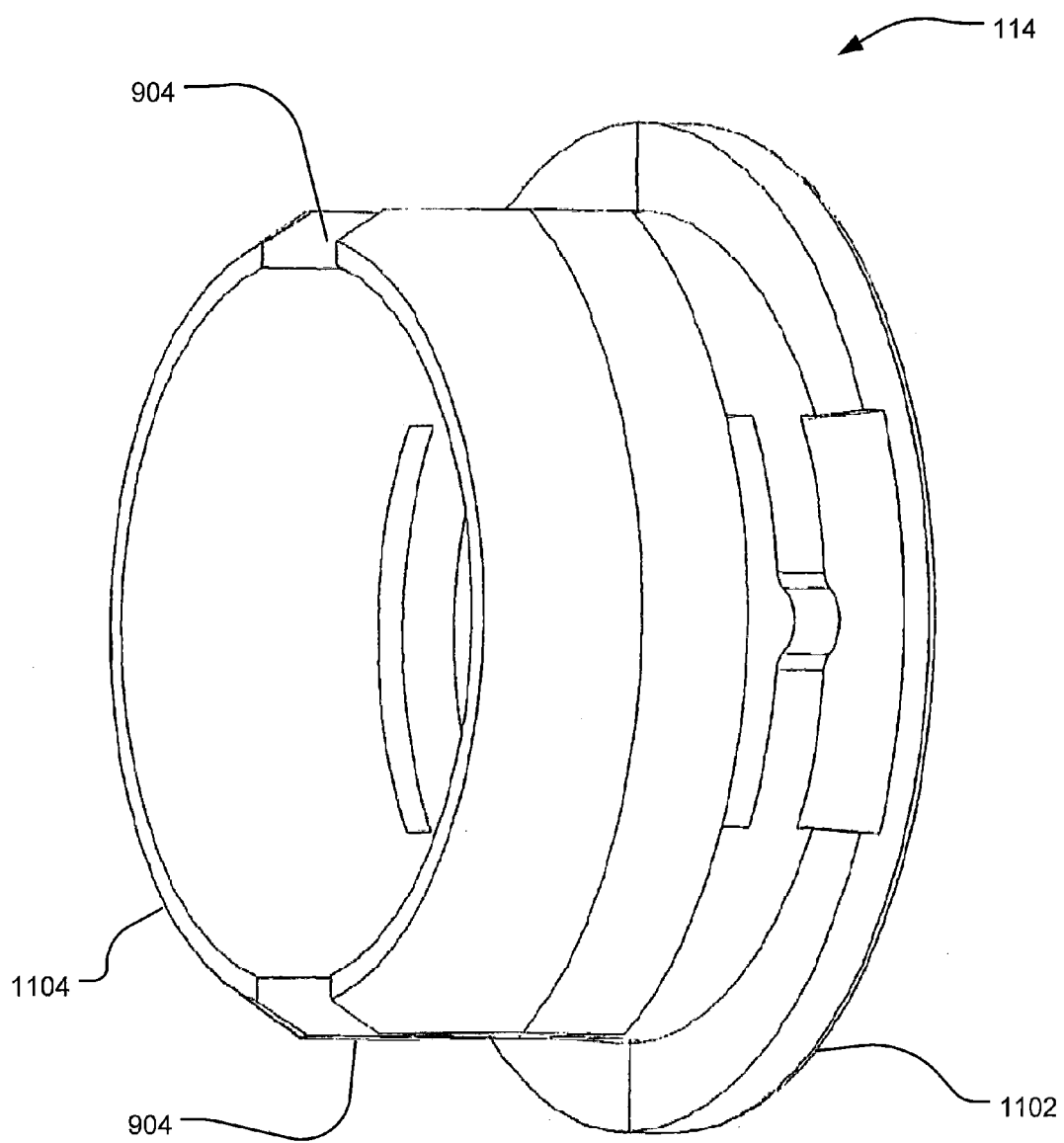
FIG. 11 illustrates a back perspective view of an example port plug.
Figure 12:
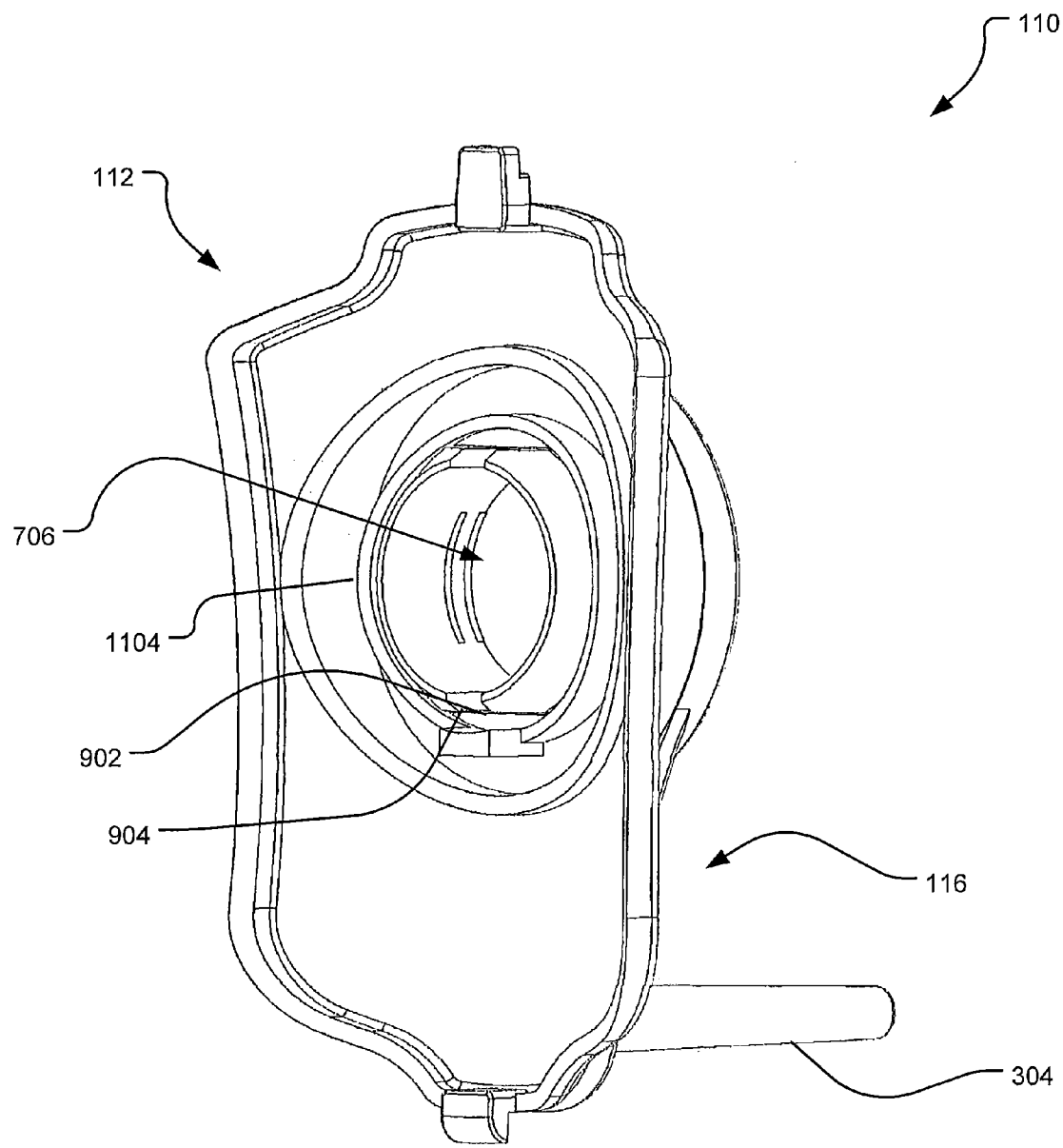
FIG. 12 illustrates a back perspective view of an example feeding station having a rotational perch.

FIGS. 10-12 illustrate back perspective views of various components of the feeder 110. In FIG. 10, the port 112 is shown, which includes the protruding portion 704 extending from the surface 702 to define the opening 706. In one implementation, the protruding portion 704 further includes the substantially flat portions 902 configured to engage the port plug 114. In one implementation, the surface 702 has a lip 1002, a first mounting portion 1004, and a second mounting portion 1106 each configured to engage a portion of the wall 108. For example, the lip 1002 extends from the surface 702 to provide a snug fit against the wall 108 along the length of the lip 1002. Further, the mounting portions 1004 and 1006 are configured to engage the reservoir 102 through an opening in the wall 108.

As can be understood from FIGS. 11 and 12, the port 112 may be configured to engage the port plug 114. In one implementation, the port plug 114 includes a tube 1104 and a lip 1102. The tube 1104 is inserted into the opening 706 such that the channels 904 to engage the flat portions 902 of the port 112. The port plug 114 may be inserted into the opening 706 until the barbed portion 906 of the perch 116 is engaged by both the lip 1104 and the port 112, thereby rotationally attaching the perch 116 to the port 112.

Based upon design preferences, it is understood that the specific order or hierarchy of steps in the method can be rearranged while remaining within the disclosed subject matter. The accompanying method claims present elements of the various steps in a sample order and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

The above specification, examples, and data provide a complete description of the structure and use of example implementations of the invention. Various modifications and additions can be made to the exemplary implementations discussed without departing from the spirit and scope of the presently disclosed technology. For example, while the implementations described above refer to particular features, the scope of this disclosure also includes implementations having different combinations of features and implementations that do not include all of the described features. Accordingly, the scope of the presently disclosed technology is intended to embrace all such alternatives, modifications, and variations together with all equivalents thereof.

What is claimed is:

1. A bird feeder comprising:
   a reservoir having an interior configured to hold bird food, the reservoir having an opening in a wall to provide access to the interior of the reservoir; and
   a perch connected to the wall using a port such that the perch is moveable to a plurality of positions around the opening in the wall, the port including a protruding portion extending from a surface, the protruding portion defining an opening providing access to the opening in the wall.

2. The bird feeder of claim 1, wherein the perch is moved to the plurality of positions by rotating the perch.

3. The bird feeder of claim 1, wherein the plurality of positions include above the opening and below the opening.

4. The bird feeder of claim 1, wherein the perch includes a projecting portion extending from a surface.

5. The bird feeder of claim 4, wherein the projecting portion extends linearly.

6. The bird feeder of claim 1, wherein the perch includes a ring adapted to engage the protruding portion of the port to connect the perch to the wall.

7. A bird feeding station comprising:
   a perch having a projecting portion extending from a surface, the perch configured to be connected to a wall on a reservoir such that the perch is movable to a plurality of positions around an opening in the wall of the reservoir, wherein the perch is moved to the plurality of positions by rotating the perch about an axis line extending through the opening in the wall.

8. The bird feeding station of claim 7, wherein the projecting portion extends linearly from the surface.

* * * * *